Sept. 20, 1932. H. V. NIELSEN 1,878,445
MACHINE FOR FILLING BOTTLES AND OTHER VESSELS
Filed April 19, 1930 2 Sheets-Sheet 1
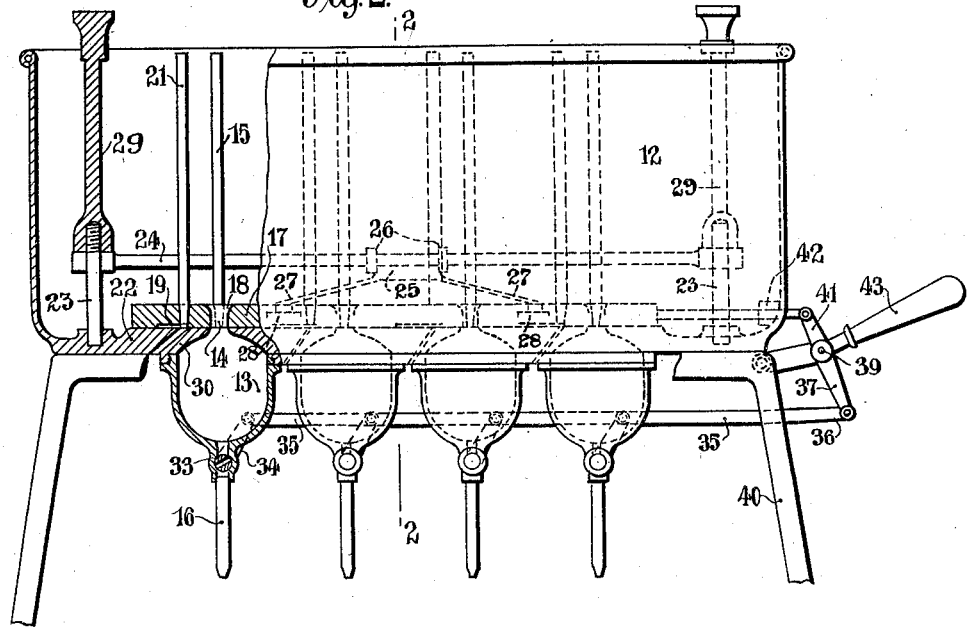
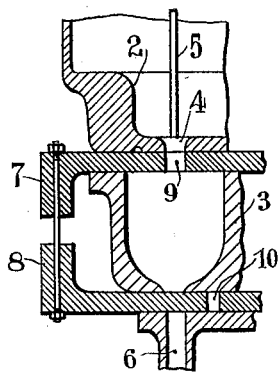
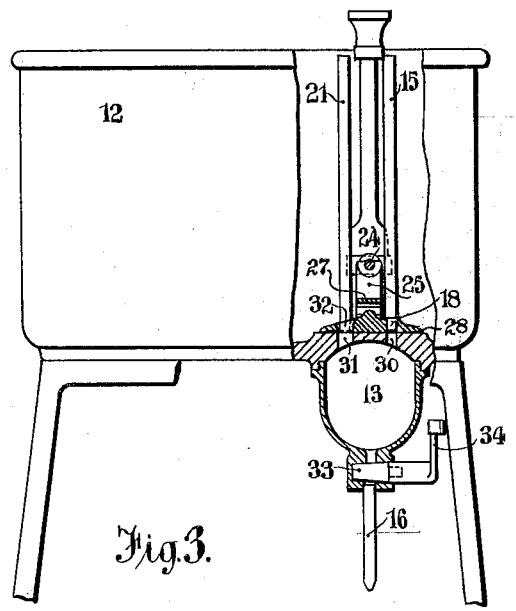
Heinrich V. Nielsen,
INVENTOR.
BY Toulmin & Toulmin
ATTORNEYS.

Sept. 20, 1932.  H. V. NIELSEN  1,878,445
MACHINE FOR FILLING BOTTLES AND OTHER VESSELS
Filed April 19, 1930  2 Sheets-Sheet 2
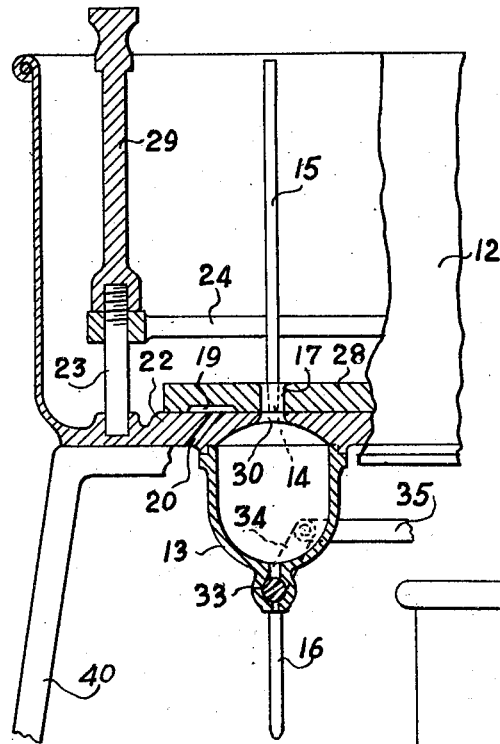
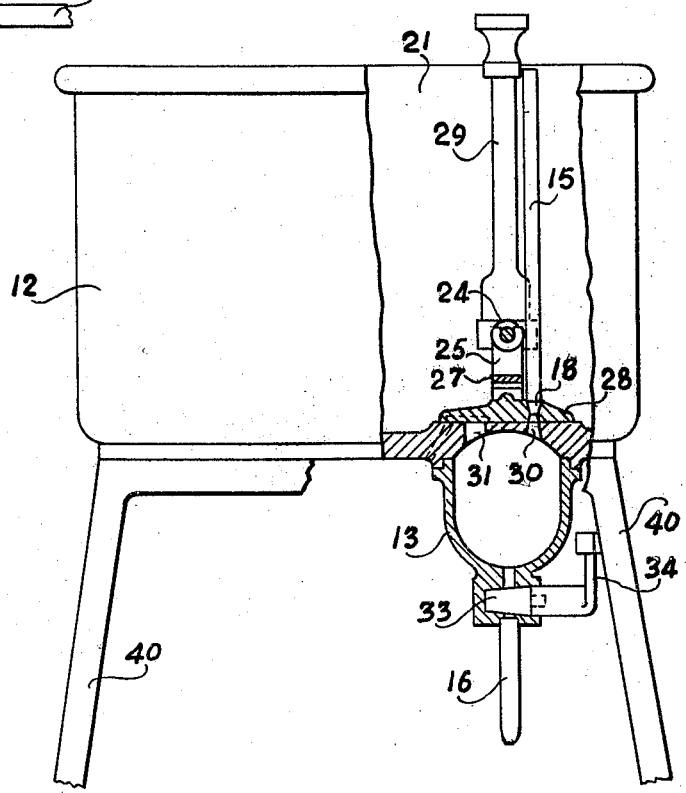
HEINRICH V. NIELSEN, Patented Sept. 20, 1932

1,878,445

UNITED STATES PATENT OFFICE

HEINRICH VALDEMAR NIELSEN, OF CARDIFF, WALES, ASSIGNOR, BY DIRECT AND MESNE ASSIGNMENTS, TO THE HYGIENIC MANUFACTURES AND SUPPLIES COMPANY LIMITED, OF LONDON COUNTY, ENGLAND, A BRITISH COMPANY

MACHINE FOR FILLING BOTTLES AND OTHER VESSELS

Application filed April 19, 1930, Serial No. 445,657, and in Great Britain April 23, 1929.

This invention relates to machines for filling receptacles with liquid, or with comminuted dry materials, the liquids being typifiable by milk and the dry material by sugar.

The present invention consists in providing a machine for filling bottles and other vessels with liquid and other flowable material comprising a container, at least one measuring chamber provided with at least one port through which said chamber is filled, an orificed bottom to said container for filling said chamber from the container, means for cutting off supply of liquid to said chamber and delivering the liquid to a receptacle, a conduit for the escape of air from the measuring chamber through the source of supply, said conduit forming an air exit when the measuring chamber is being filled, and at least one subsidiary conduit forming an air duct being provided in connection with said port, said subsidiary conduit forming an air passage to the measuring chamber when charge takes place, means being provided whereby there is relative movement between the measuring chamber and the means for cutting off the supply of the liquid and other flowable material, an arrangement in which the measuring chamber is fixed and a device comprising a valve sliding on the bottom of the container is provided for opening and cutting off supply between the container and the measuring chamber and between the measuring chamber and the receptacle.

The accompanying drawings illustrate three forms of the invention.

Fig. 1 illustrates one form in sectional elevation,

Fig. 2 illustrates a modification in side elevation partly in section,

Fig. 3 illustrates in a tranverse section along line 2—2 the form illustrated in Fig. 2.

Figs. 2a and 3a illustrate in transverse section a modified form in part of the invention.

In one form of device illustrated in Fig. 1 I provide a stationary container 2 and a stationary or fixed set of one or more measuring chambers 3, the container and the measuring chamber or chambers being spaced apart. The container is provided with one or more discharge outlets 4 and corresponding air tubes 5, constructed and operating substantially as hereinafter described with reference to Figs. 2 and 3, the difference being that whereas a plate valve is described here (Fig. 1) for discharge from the measuring chamber rotary valves are shown and described for this purpose in Figs. 2 and 3. The difference is that they are fixed and not movable. Below the one or more measuring chambers 3 and spaced therefrom are disposed a corresponding series of nozzles 6 substantially as described hereinbefore, so that the measuring chamber or chambers 3 can when desired discharge into them. Between the container 2 and the measuring chamber or chambers 3, and between the measuring chamber or chambers 3 and the nozzles 6 are disposed slide valves 7, 8, which may be operable together or independently and which are provided with suitable orifices 9, 10, to allow the container to discharge into the one or more measuring chambers 3 and the one or more measuring chambers 3 to discharge through the nozzles 6. The arrangement is such that when the container 2 is discharging into the one or more measuring chambers 3, communication between the said measuring chamber or chambers 3 and the nozzle or nozzles 6 is cut off and when the communication between the container and the one or more measuring chambers 3 is cut off, communication between the one or more measuring chambers 3 and the corresponding nozzles 6 is established. Subsidiary air grooves or ducts or channels 11 substantially as and for the purposes hereinbefore set forth are provided, the air grooves or ducts or channels 11 being however disposed in or in connection with the bottom of the container 2 or with a plate disposed therein.

In the form of device illustrated in Figs. 2 and 3, I provide a stationary container 12 and a stationary or fixed set of one or more measuring chambers 13, the container and the measuring chamber or chambers being spaced apart. The container 12 is provided with one or more discharge outlets 14 and corresponding air tubes 15 substantially as described in my copending U. S. patent application No. 276,146. The construction of the one or more measuring chambers 13 is substantially like that described in the said copending patent application and the measuring chamber or chambers 13 are disposed so that the container 12 can discharge into them. The difference is that they are fixed and not movable. Below the one or more measuring chambers 13 are spaced therefrom, if desired, are disposed a corresponding series of nozzles 16 substantially as described in the parent patent, so that the measuring chamber or chambers 13 can when desired discharge through them. At the bottom of the container is disposed a slide valve 17 and which is provided with suitable orifices 18 to allow the container to discharge into the one or more measuring chambers 13 or to cut off said discharge according to the position of said slide valve 17. The slide valve plate 17 is provided with air grooves 19 which air grooves 19 are adapted to permit of the ingress of air to the measuring chambers, and to communicate with air channels 20 through the base of the container to the atmosphere, for the ingress of air to the measuring chamber or chambers 13. The slide valve plate 17 is spring pressed against the base 22 of the container 12 and for this purpose uprights 23 are secured to the base 22 of the container and on these uprights 23 slides a crossbar 24 to which is attached a spring device 25 pressing upon said slide valve plate 17. Stops 26 are placed on the crossbar 24 to hold the spring device 25 in position and the spring device comprises leaf spring 27 of which the ends 28 press upon the slide valve plate 17. The position of the leaf spring 27 is adjusted by screw members or sleeves 29 extending upwards from the uprights 23 to above the top of the container, the screwing upward or downward of which adjusts the height of the crossbar 24 and thus the force which the spring device 25 acts on the slide valve plate 17. The measuring chambers 13 are domed or curved at or towards the top and are provided with two orifices each, one orifice 30 being adapted to communicate with corresponding orifice 18 in the slide plate 17 leading to the duct 15 for the egress of air and the other orifice 31 being adapted to communicate with an orifice 32 in the slide valve plate 19 leading to the duct 21 for the ingress of air. The discharge nozzles 16 of the measuring chambers 13 are closed and opened by suitable valves or cocks 33 which are adapted to be opened or closed simultaneously by being attached by arms 34 pivotally attached to a horizontal bar 35 slidably disposed or movable in a longitudinal direction the free end of the bar 36 being attached to one arm 37 of a lever pivoted at 39 on the frame 40 of which the other arm 41 is pivotally attached to the slide valve plate 17 by a rod passing through a gland 42 in the container 12 so that when the supply valves 17 to the measuring chambers 13 are open the discharge valves 33 of the measuring chambers 13 are closed and vice versa. A handle 43 is provided to operate the said lever 38 or the said lever may be operated by a system of levers suitably disposed and mechanically operated or manually operated or otherwise suitably operated.

The slide valve plate may be made of metal or glass or any other suitable material.

It will thus be seen that assuming the parts are assembled in the operative position, and the mechanism 41, 43 operated to bring the ports 18, 32 in the upper slide valve 17 into register with those 30, 31 in the bottom of the tank 12, that communication will be established between the tank and the measuring vessels 13, while the ports in the valves 33 will be out of register with the nozzles 16 associated with the bottles or receptacles (not shown) to be filled.

The pipes 15 are filled with milk to the level of the main supply in tank 12 owing to the rise of the milk therein during the interval between the previous operation of the filling of the container and the discharge into the bottle having taken place when the delivery movement took place, this milk together with the main supply in tank 12 being cut off from vessels 13 on the movement of the measuring chambers to the position for discharge. The tank 12 is open to the atmosphere and communicates with chambers 13 through corresponding ports 18, 30, and 31, 32, and the air in chambers 13 can escape to the atmosphere through ports and grooves 20, 19 which prevent an air lock. The ports 30 are elongated and communicate with ports 18 before ports 32 communicate with ports 31 so that the milk discharges down the pipes 15 through ports 18, 30, into chambers 13 under pressure of air above it, before the main supply commences to run into the measuring chambers; hereby is obtained an unobstructed exit for the air through pipes 15, whilst filling of the chambers 13 is continued and completed. Further movement of the measuring chambers 13 causes communication to be cut off between grooves and ports 19, 21. The milk from tank 12 then runs into chambers 13 through ports 31, 32, the air escaping through ports 18, 30, and 15. Milk cannot escape from the chambers 13 thus filling.

On operating the mechanism to slide plate 17 so as to move ports 32 from under ports 31 the milk supply to chamber 13 from tank 12 is cut off. At the same time there is communication between grooves and ports 19, 20, which allows chambers 13 to communicate with the atmosphere and air to enter said chambers, and ports in valves 33 open to nozzles 16. Since air can enter the chambers 13 the milk escapes into the bottles.

In the modified form illustrated in Figure 4 the slide valve plate 17 is provided with air grooves 19 which communicate with ducts leading upwards to the container 12 for the increase of air to the measuring chamber or chambers 13. The operation of this device is substantially the same as that described with reference to the previous example.

What I claim and desire to secure by Letters Patent is:—

1. For a machine for filling bottles and other vessels with liquid and other flowable material comprising a container, fixed measuring chambers provided with ports through which said chambers are filled, an orificed bottom to said container for filling said chambers from the container, a spring pressed valve slidable on the bottom of the container for opening and cutting off supply of flowable material to said chambers, conduits for the escape of air from the measuring chambers through the source of supply, said conduits forming air exits when the measuring chambers are being filled, subsidiary conduits forming air ducts in connection with said ports, said subsidiary conduits forming air passages to the measuring chambers when discharge thereof takes place, means being provided for opening and cutting off supply between the measuring chambers and a vessel to be filled.

2. For a machine for filling bottles and other vessels with liquid and other flowable material comprising a container, at least one fixed measuring chamber provided with at least one port through which said chamber is filled, an orificed bottom to said container for filling said chamber from the container, an adjustable spring pressed valve slidable on the bottom of the container for opening and cutting off supply of flowable material to said chamber, a conduit for the escape of air from the measuring chamber through the source of supply, said conduit forming an air exit when the measuring chamber is being filled, and at least one subsidiary conduit forming air duct passing through the container bottom in connection with said port, said subsidiary conduit forming an air passage to the measuring chamber when discharge thereof takes place, means being provided for opening and cutting off supply between the measuring chamber and a vessel to be filled.

3. For a machine for filling bottles and other vessels with liquid and other flowable material comprising a container, at least one fixed measuring chamber provided with at least one port through which said chamber is filled, an orificed bottom to said container for filling said chamber from the container, an adjustable spring pressed valve slidable on the bottom of the container for opening and cutting off supply of flowable material to said chamber, a screw device effecting said adjustment, a conduit for the escape of air from the measuring chamber through the source of supply, said conduit forming an air exit when the measuring chamber is being filled and at least one subsidiary conduit forming an air duct passing through the container bottom in connection with said port, said subsidiary conduit forming an air passage to the measuring chamber when discharge thereof takes place, means being provided for opening and cutting off supply between the measuring chamber and a vessel to be filled.

4. For a machine for filling bottles and other vessels with liquid and other flowable material comprising a container, at least one fixed measuring chamber provided with at least one port through which said chamber is filled, an orificed bottom to said container for filling said chamber from the container, an adjustable spring pressed valve slidable on the bottom of the container being provided for opening and cutting off supply of flowable material to said chamber, a screw threaded rod device effecting said adjustment, a conduit for the escape of air from the measuring chamber through the source of supply, said conduit forming an air exit when the measuring chamber is being filled, and at least one subsidiary conduit in connection with said port, said subsidiary conduit forming an air passage to the measuring chamber when discharge thereof takes place, and discharge means from the measuring chamber operated simultaneously with the inlet valve to the measuring chamber.

In testimony whereof, I affix my signature.

HEINRICH VALDEMAR NIELSEN.